United States Patent
Zisimopoulos

(10) Patent No.: US 8,229,346 B2
(45) Date of Patent: Jul. 24, 2012

(54) METHOD AND APPARATUS FOR PROVIDING MULTIMEDIA BROADCASTING MULTICASTING SERVICES

(75) Inventor: Haris Zisimopoulos, Reading (GB)

(73) Assignee: Nvidia Corporation, Santa Clara, CA (US)

( * ) Notice: Subject to any disclaimer, the term of this patent is extended or adjusted under 35 U.S.C. 154(b) by 1020 days.

(21) Appl. No.: 11/803,806

(22) Filed: May 15, 2007

(65) Prior Publication Data

US 2008/0287057 A1  Nov. 20, 2008

(51) Int. Cl.
  *H04H 20/74* (2008.01)
(52) U.S. Cl. ..... 455/3.02; 455/466; 455/3.03; 455/3.06; 725/62
(58) Field of Classification Search .......... 455/466, 455/3.02–3.06; 725/62
  See application file for complete search history.

(56) References Cited

U.S. PATENT DOCUMENTS

| | | | |
|---|---|---|---|
| 7,506,367 B1 * | 3/2009 | Ishibashi | 726/10 |
| 2008/0016151 A1 * | 1/2008 | Howard et al. | 709/203 |
| 2008/0101317 A1 * | 5/2008 | Bouazizi | 370/342 |
| 2008/0242224 A1 * | 10/2008 | Fratti et al. | 455/3.06 |
| 2009/0219848 A1 * | 9/2009 | Lohmar et al. | 370/312 |

FOREIGN PATENT DOCUMENTS

| WO | WO2005004516 | 1/2005 |
|---|---|---|
| WO | 2005057978 | 6/2005 |

OTHER PUBLICATIONS

"3rd Generation Partnership Project; Technical Specification Group Services and System Aspects; Multimedia Broadcast/Multicast Service; Stage 1 (Release 8)," (Mar. 2007). 3GPP:Valbonne, France, TS 22.146 v8.2.0:1-18.
"3rd Generation Partnership Project; Technical Specification Group Services and System Aspects; Multimedia Broadcast/Multicast Service (MBMS); Architecture and functional description (Release 7)," (Mar. 2007). 3GPP:Valbonne, France, TS 23.246 v7.2.0:1-53.
"3rd Generation Partnership Project; Technical Specification Group Services and System Aspects; Multimedia Broadcast/Multicast Service (MBMS); Protocols and codecs (Release 7)," (Mar. 2007). 3GPP:Valbonne, France, TS 26.346 v7.3.0:1-128.
"3rd Generation Partnership Project; Technical Specification Group Core Network and Terminals; Interworking between the Public Land Mobil Network (PLMN) supporting packet based services and Packet Data Networks (PDN) (Release 7)," (Mar. 2007). 3GPP:Valbonne, France, TS 29.061 v7.3.0:1-117.
"3rd Generation Partnership Project; Technical Specification Group Services and System Aspects; Generic Authentication Architecture (GAA); Generic bootstrapping architecture (Release 7)," (Mar. 2007). 3GPP:Valbonne, France, TS 33.220 v7.7.0:1-73.
"3rd Generation Partnership Project; Technical Specification Group Services and System Aspects; 3G Security; Security of Multimedia Broadcast/Multicast Service (MBMS) (Release 7)," (Mar. 2007). 3GPP:Valbonne, France, TS 33.246 v7.3.0:1-62.

(Continued)

*Primary Examiner* — Fayyaz Alam

(57) ABSTRACT

A method of providing multimedia broadcast multicast services (MBMS) over a communication system that comprises a shared network and a proprietary network comprises allocating a first portion of logic elements of a broadcast multicast service centre (BM-SC) to support MBMS content delivery over the shared network and allocating a second portion of logic elements of the BM-SC to support MBMS content delivery over the proprietary network.

33 Claims, 11 Drawing Sheets

OTHER PUBLICATIONS

Digital Cellular Telecommunications System (Phase 2+); Universal Mobile Telecommunications System (UMTS); Multimedia Boradcast/Multicast Service (MSMS); Stage 1 (3GPP TS 22.146 version 7.2.0 Release 7); Global System For Mobile Communications; Sep. 2006.

European Patent Application No. 08 749 926.5-1244; Communication Pursuant to Article 94(3)EPC; Dated Aug. 4, 2011.

European Patent Application No. 08 749 926.5-1244; Communication Pursuant to Article 94(3)EPC; Dated Sep. 23, 2010.

PCT Patent Application No. PCT/EP2008/055343; International Preliminary Report on Patentability Dated Nov. 17, 2009.

PCT Patent Application No. PCT/EP2008/055343; International Search Report and Written Opinion Dated Dec. 23, 2008.

\* cited by examiner

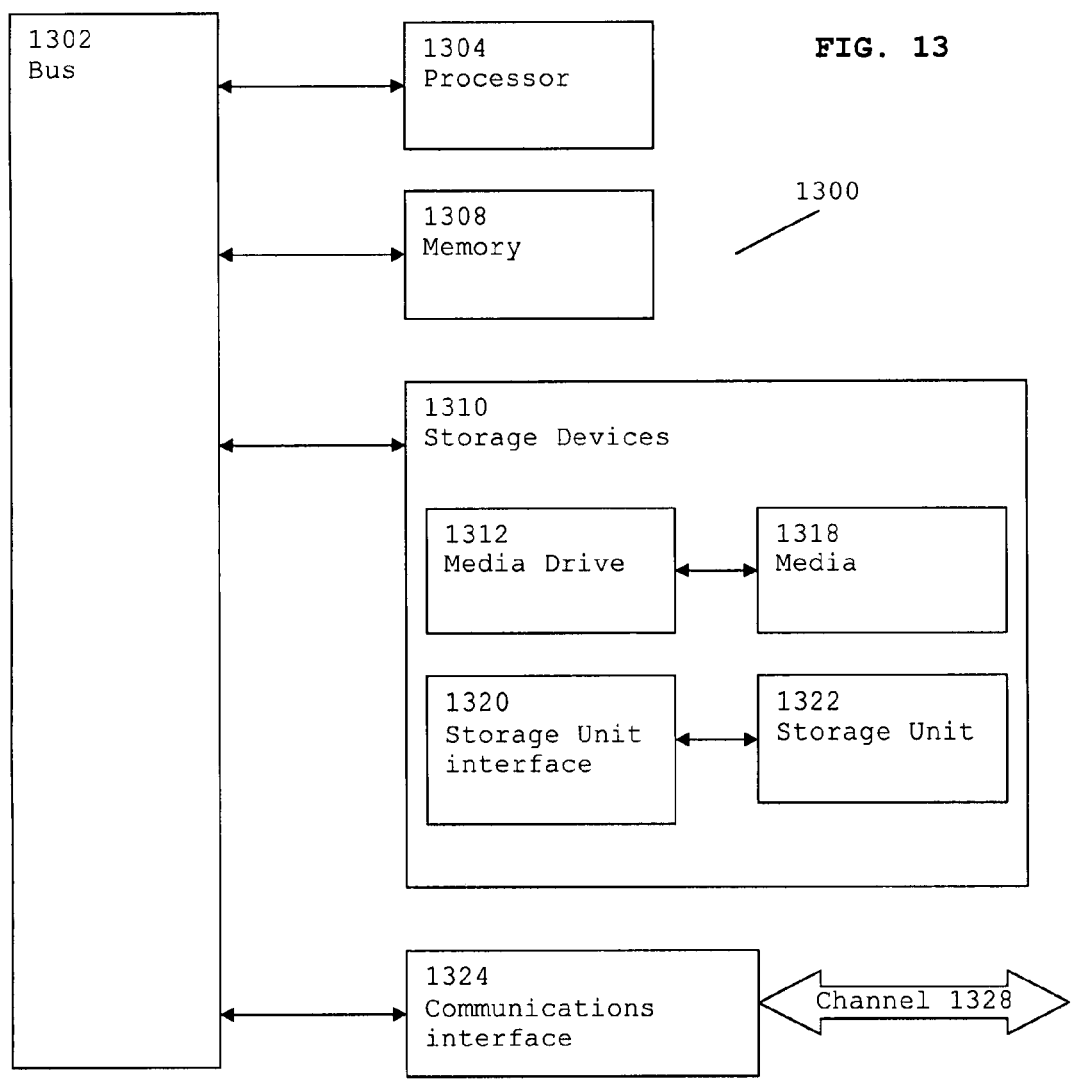

METHOD AND APPARATUS FOR PROVIDING MULTIMEDIA BROADCASTING MULTICASTING SERVICES

FIELD OF THE INVENTION

The field of the invention generally relates to a method and apparatus for providing multimedia broadcasting multicasting services. In particular, but not exclusively, the field of the invention relates to providing multimedia broadcasting multicasting services concurrently over a shared and proprietary network.

BACKGROUND OF THE INVENTION

Multimedia Broadcast Multicast Service (MBMS) is a broadcasting and multicasting service offered over mobile telecommunications networks, such as General Packet Radio System (GPRS) networks, Universal Mobile Telecommunication System (UMTS) networks, Evolved Packet System (EPS) and the like. The technical specifications for MBMS include 3GPP TS 22.146, 3GPP TS 23.246 and 3GPP TS 26.346.

Mobile TV is an example of a service that may be provided over MBMS. Mobile TV is a service provided to subscribers via mobile telecommunications networks, thereby providing television services to mobile devices.

FIG. 1 illustrates an example of a known architecture 100 for providing MBMS in a shared network basis. The architecture 100 comprises an operator network 110, such as a GPRS, UMTS and EPS network.

The operator network 110 comprises a communication node 112, such as a base station, which is coupled to one or more user equipment (UE) devices, a UE comprising, by way of example, a mobile telephone handset. The operator network 110 further comprises a Gateway GPRS Support Node (GGSN) 114, which is coupled to a Broadcast Multicast Service Centre (BM-SC) 130.

The architecture 100 further comprises a MBMS network 140. In the same way as for the operator network 110, the MBMS network 140 comprises a communication node 142, coupled to the one or more UEs 120, and a GGSN 144, coupled to the BM-SC 130. The MBMS network 140 is, in this case, a shared network. That is to say, the MBMS network 140 may be utilised for the provision of, for example, Mobile TV by more than one operator.

FIG. 2 illustrates an example of the provision of services, such as Mobile TV via MBMS utilising the architecture of FIG. 1, as is known in the art.

A first UE 210 is coupled to a first operator network 220, and a second UE 230 is coupled to a second operator network 240. Each of the operator networks 240 is coupled to a BM-SC 250. The BM-SC 250 is further coupled to a shared MBMS network 260, arranged to provide content, for example Mobile TV content, to the UEs 210, 230 by way of broadcasting/multicasting content streams.

The BM-SC 250 receives operator-related content, which is content specific to one of the operator networks 220, 240, as well as common content.

Each of the operator networks 220, 240 advertises, or otherwise provides, information publicising available content to their respective UEs 210, 230. That is to say, the first operator network 220 provides information publishing operator #1 content and common content to the first UE 210. Conversely, the second operator network 240 provides information publishing operator #2 content and common content to the second UE 230.

A UE 210, 230 is then able to request from its respective operator network 220, 240 the content that it wishes to receive (e.g. subscribe to). The operator network 220, 240 subsequently informs the BM-SC 250 of the requested content, and informs the UE 210, 230 of the channel(s) on which the requested content will be available, as well as any encryption keys etc. required to access the content. The BM-SC 250 then provides the content to the shared MBMS network 260, from which the UE 210, 230 is able to obtain the content.

A problem with this known implementation of MBMS is that all content, including operator specific content, is required to be fed to a single, shared BM-SC in order to be provided over the MBMS network. This is undesirable from an operator's perspective for various reasons including, by way of example:

i) commercial agreements between operators and content providers that may not allow the operator to deliver the content outside of their administrative domains;
  ii) Operators may want to provide higher layer service functions, such as access control and charging, within their network for trust reasons; and
  iii) Operators may already have a BM-SC platform commissioned, and as such would like to reuse their available functionality.

Thus, for example, existing wideband CDMA core networks (such as 3GPP wireless communication systems) are preferred to be de-coupled when considering delivery of MBMS multimedia streams.

A need therefore exists for an improved method and apparatus for providing multimedia broadcast multicast services over a shared network wherein one or more of the abovementioned disadvantage(s) may be alleviated.

SUMMARY OF THE INVENTION

Accordingly, the invention seeks to mitigate, alleviate or eliminate one or more of the abovementioned disadvantages, singly or in any combination.

According to a first aspect of the invention, there is provided a method of providing multimedia broadcast multicast services (MBMS) over a communication system that comprises a broadcast multicast service centre (BM-SC) having a plurality of logic elements and a shared network and a proprietary network for providing MBBS content. The method comprises allocating a first portion of logic elements to support MBMS content delivery over the shared network; and allocating a second portion of logic elements to support MBMS content delivery over the proprietary network.

According to an optional feature of the invention, the method comprises allocating the first portion of logic elements of a BM-SC to support MBMS content delivery over the shared network; and allocating a second portion of logic elements of the BM-SC to support MBMS content delivery over the proprietary network, where the allocation of particular logic elements is based on whether MBMS content delivery is passed to at least one of: the shared network or proprietary network. Thus, the inventive concept may be applied by allocating particular logic elements of a BM-SC to support respective proprietary and shared MBMS content delivery from a single BM-SC, without the need to duplicate all logic elements.

According to an optional feature of the invention, the allocating of a first portion and second portion of logic elements of the BM-SC to support MBMS content delivery over the proprietary network may be based on whether MBMS content is common between service providers sharing the MBMS network.

According to an optional feature of the invention, the allocating of a first portion and second portion of logic elements of the BM-SC to support MBMS content delivery over the proprietary network may be based on whether the content delivery is exclusive to an Operator of the proprietary network.

According to an optional feature of the invention, the allocating of a portion of logic elements of a BM-SC comprises allocating streaming server logic to trigger MBMS content delivery. In this manner, the triggering of MBMS content delivery may be co-ordinated by streaming server logic. For example, in one embodiment of the invention, the streaming server logic is allocated in both the first portion of logic elements to trigger MBMS content delivery over the shared network and second portion of logic elements to trigger MBMS content delivery over the proprietary network.

According to an optional feature of the invention, the allocating a portion of logic elements of a BM-SC comprises allocating streaming server logic to trigger transport key delivery. In this manner, the delivery of encrypted content may be co-ordinated by streaming server logic. In one optional embodiment of the invention, the streaming server logic to trigger transport key delivery is allocated in both the first portion of logic elements to transport key delivery over the shared network and second portion of logic elements to trigger transport key delivery over the proprietary network, thereby facilitating delivery of encrypted content over both the shared network and proprietary network.

In one optional embodiment of the invention, the management module logic constructs and distributes a service description of the MBMS content delivery, which may be forwarded to UEs requiring the MBMS content.

In one optional embodiment of the invention, the service description of the MBMS content delivery comprises generating a transport key and a service key for protecting the MBMS content delivery. In this manner, the MBMS content delivery may be encrypted for selected classes of content to be sent on the proprietary network.

In one optional embodiment of the invention, encrypting MBMS content with the transport key is performed prior to delivering the MBMS content over the shared network or the proprietary network. In one optional embodiment of the invention, the transport key, encrypted using the service key, is broadcast/multicast over at least one of: the shared network, the proprietary network.

In one optional embodiment of the invention, the proprietary network is a network Operator network. Advantageously, this may enable network Operators to share the delivery of MBMS content to its own customers, for example by encrypting the content as indicated above, using a shared BM-SC that supports both a shared network and a proprietary network.

Embodiments of the invention may allow the Network Operator to maintain the access control to the content in its domain by controlling the distribution of the encryption keys for the UEs it supports, whilst using the shared network to perform transmission of multicast/broadcast streams to the UEs it supports. Embodiments of the invention may also allow the Network Operator to perform charging of the content it provides without requiring interconnection with the shared network BM-SC.

According to a second aspect of the invention, there is provided a broadcast multicast service centre (BM-SC) for providing multimedia broadcast multicast services (MBMS) over a communication system that comprises a shared network and a proprietary network. The BM-SC comprises a first portion of logic elements capable of supporting MBMS content delivery over the shared network; and a second portion of logic elements capable of supporting MBMS content delivery over the proprietary network.

According to a third aspect of the invention, there is provided a remote station for receiving multimedia broadcast multicast services (MBMS) over a communication system that comprises a shared network and a proprietary network. The remote station comprises a receiver for receiving MBMS content delivery from a broadcast multicast service centre (BM-SC) over the shared network; wherein the receiver is also capable of receiving MBMS content delivery and/or at least one transport key from the same or different BM-SC over the proprietary network.

According to a fourth aspect of the invention, there is provided a remote station for receiving multimedia broadcast multicast services (MBMS) over a communication system that comprises a shared network and a proprietary network. The remote station comprises a receiver for receiving multimedia broadcast multicast services over the shared network; a detector for detecting that it is out of coverage from the shared network, and in response thereto, logic for initiating a Real Time Streaming Protocol (RTSP) request to send to a BM-SC streaming server of the proprietary network to maintain the same content delivery over the proprietary network it had received over the shared network.

According to a fifth aspect of the invention, there is provided a communication system for supporting multimedia broadcast multicast services (MBMS), wherein the communication system comprises a shared network and a proprietary network. The communication system comprises logic arranged to allocate a first portion of logic elements of a broadcast multicast service centre (BM-SC) to support MBMS content delivery over the shared network.; wherein the logic is also arranged to allocate a second portion of logic elements of the BM-SC to support MBMS content delivery over the proprietary network.

According to a sixth aspect of the invention, there is provided a computer program product comprising executable program code for supporting multimedia broadcast multicast services (MBMS). The computer program product comprises program code for allocating a first portion of logic elements of a broadcast multicast service centre (BM-SC) to support MBMS content delivery over the shared network and allocating a second portion of logic elements of the BM-SC to support MBMS content delivery over the proprietary network.

According to a seventh aspect of the invention, there is provided an integrated circuit for supporting multimedia broadcast multicast services (MBMS) in a communication system that comprises a shared network and a proprietary network. The integrated circuit comprises logic arranged to allocate a first portion of logic elements of a broadcast multicast service centre (BM-SC) to support MBMS content delivery over the shared network. The logic is also arranged to allocate a second portion of logic elements of the BM-SC to support MBMS content delivery over the proprietary network.

These and other aspects, features and advantages of the invention will be apparent from, and elucidated with reference to, the embodiments described hereinafter.

Figure 1:
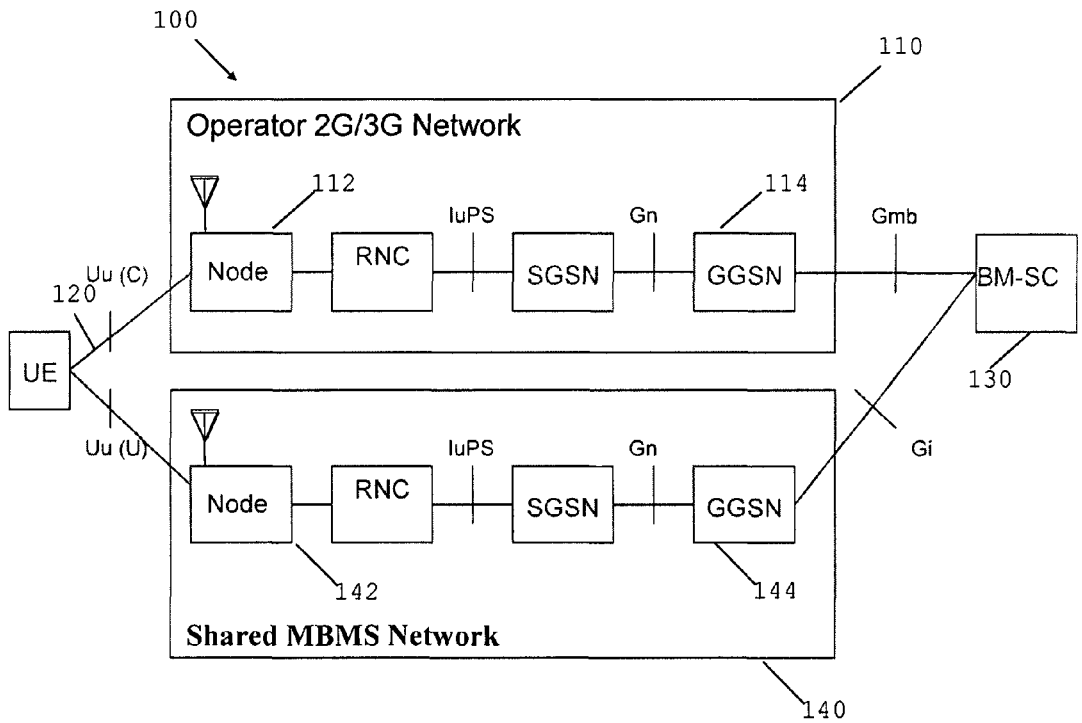
FIG. 1 illustrates an example of a known architecture for providing multimedia broadcast multicast services (MBMS).
Figure 2:
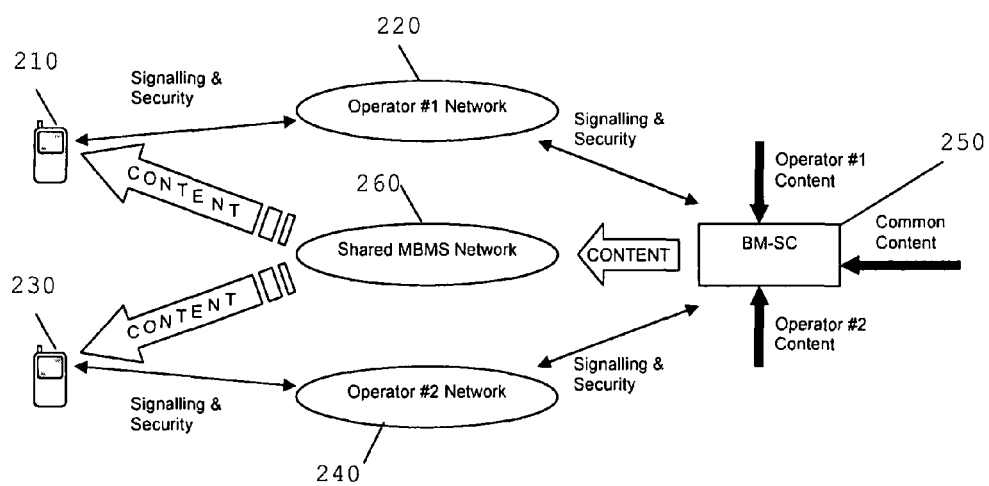
FIG. 2 illustrates an example of a provision of MBMS content utilising the known architecture of FIG. 1.
Figure 3:
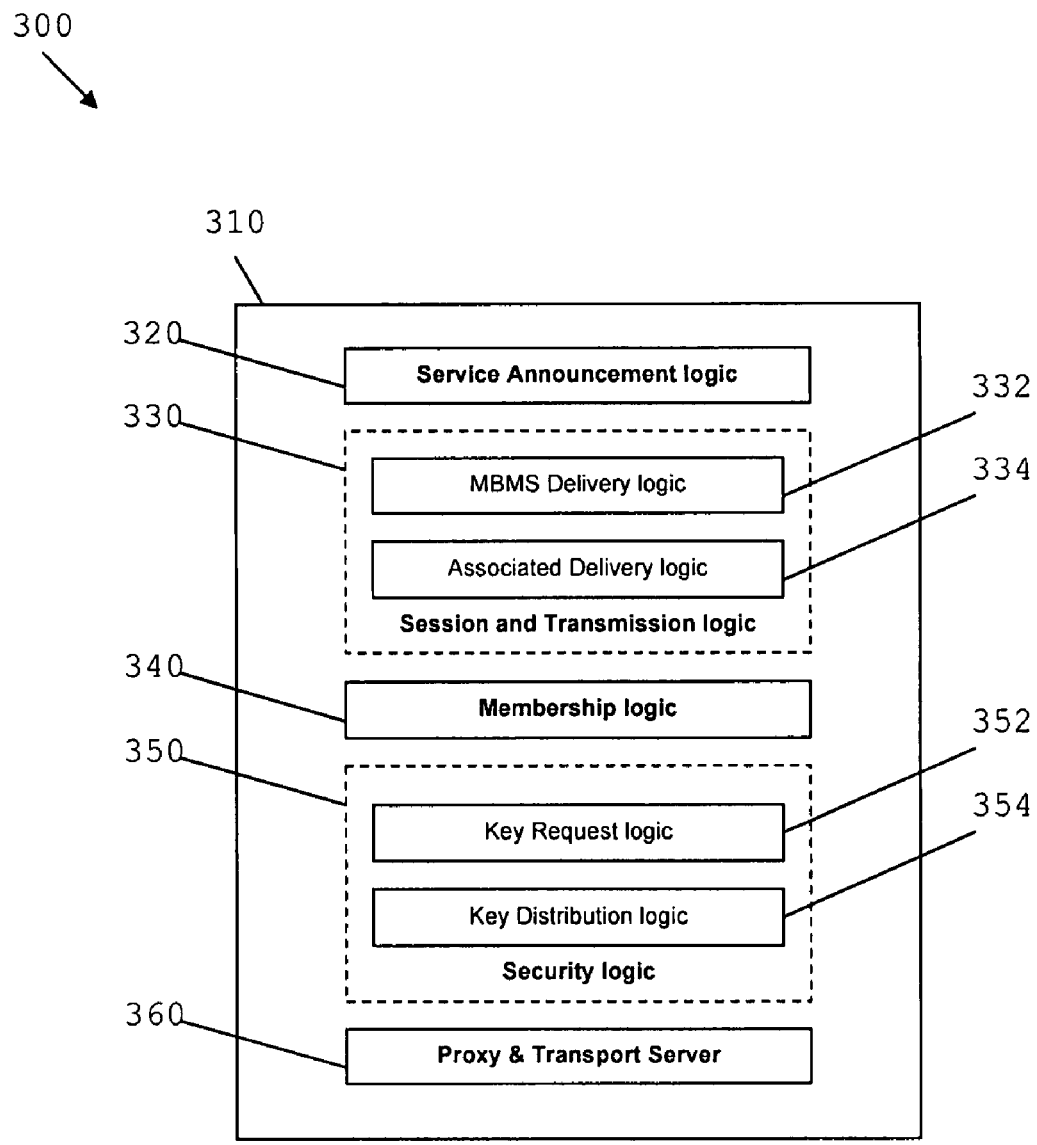

Embodiments of the invention will now be described, by way of example only, with reference to the accompanying drawing(s), in which:

FIG. 3 illustrates a sub-functional structure of a broadcast multicast service centre (BM-SC) according to embodiments of the invention.

Figure 4:
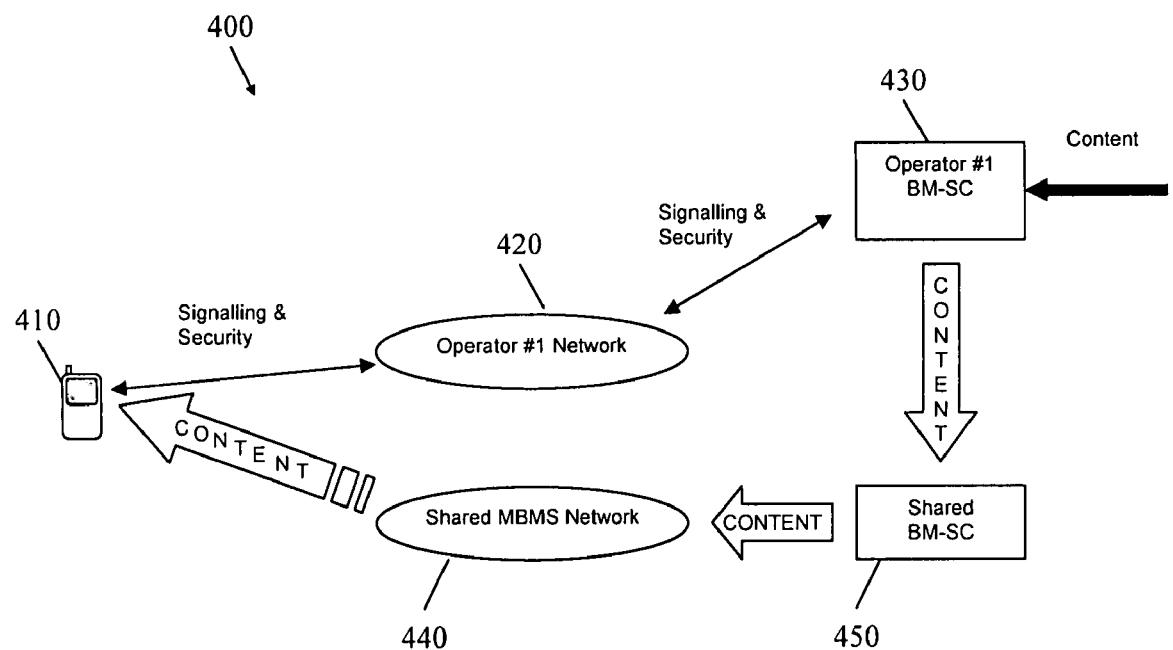

FIG. 4 illustrates a communications system for providing broadcast and/or multicast content according to a first embodiment of the invention.

Figure 5:
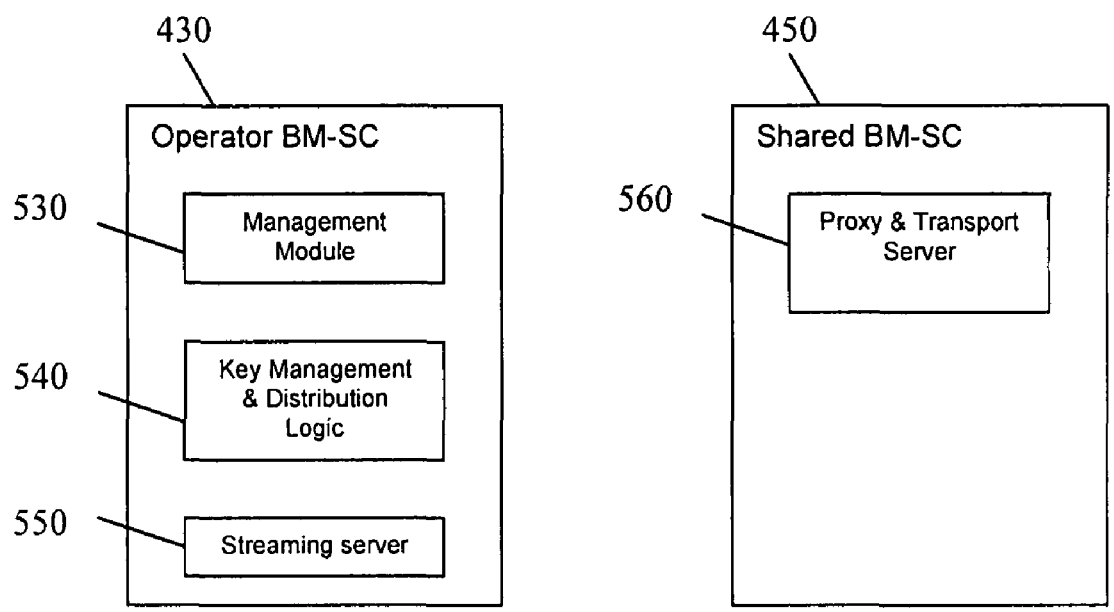

FIG. 5 illustrates examples of the functional components of an operator (BM-SC) and a shared (BM-SC) of FIG. 4.

Figure 6:
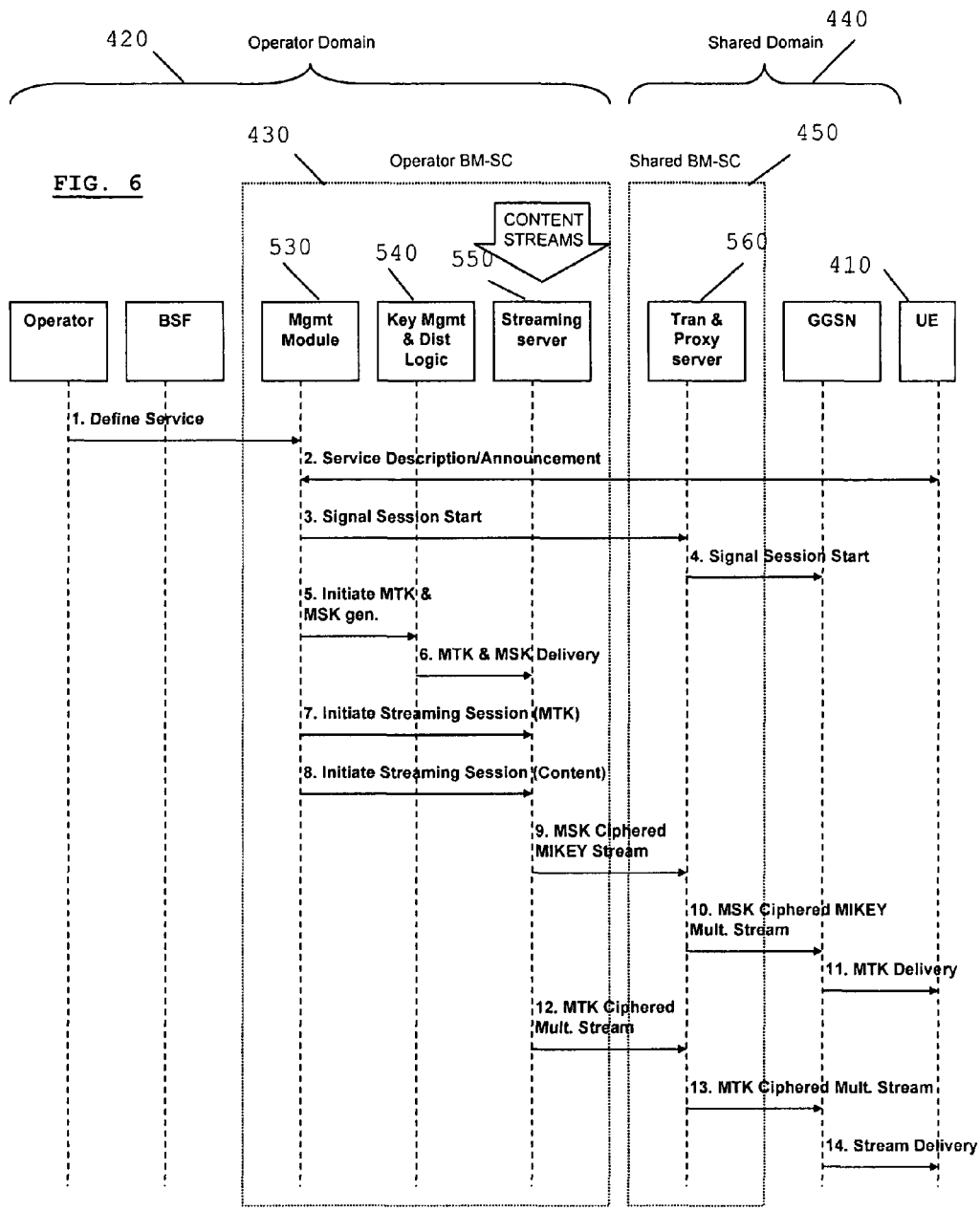

FIG. 6 illustrates an example of signalling flow for the provision of an MBMS service for the embodiment illustrated in FIG. 4.

Figure 7:
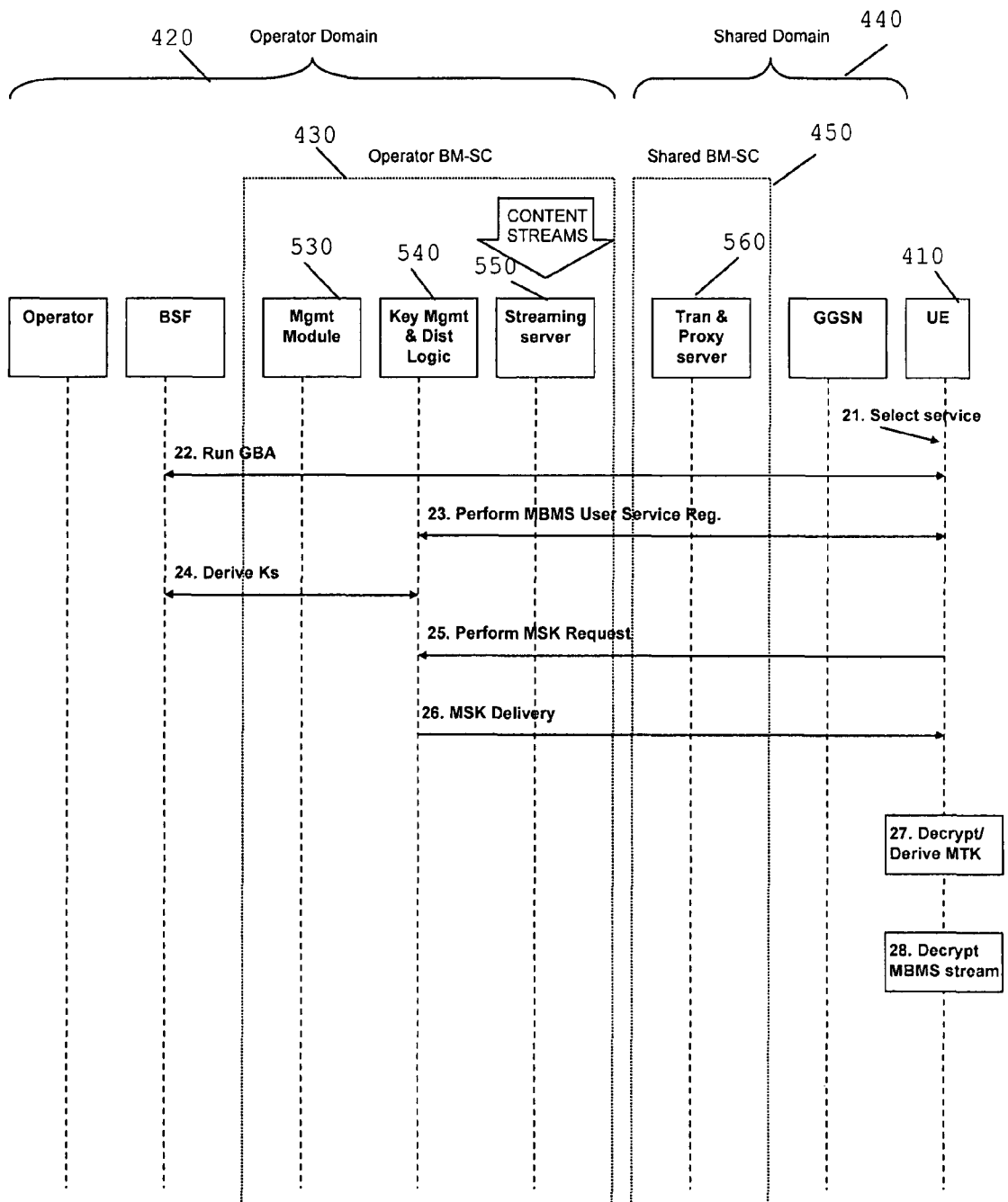

FIG. 7 illustrates an example of signalling flow for the accessing of an MBMS service.

Figure 8:
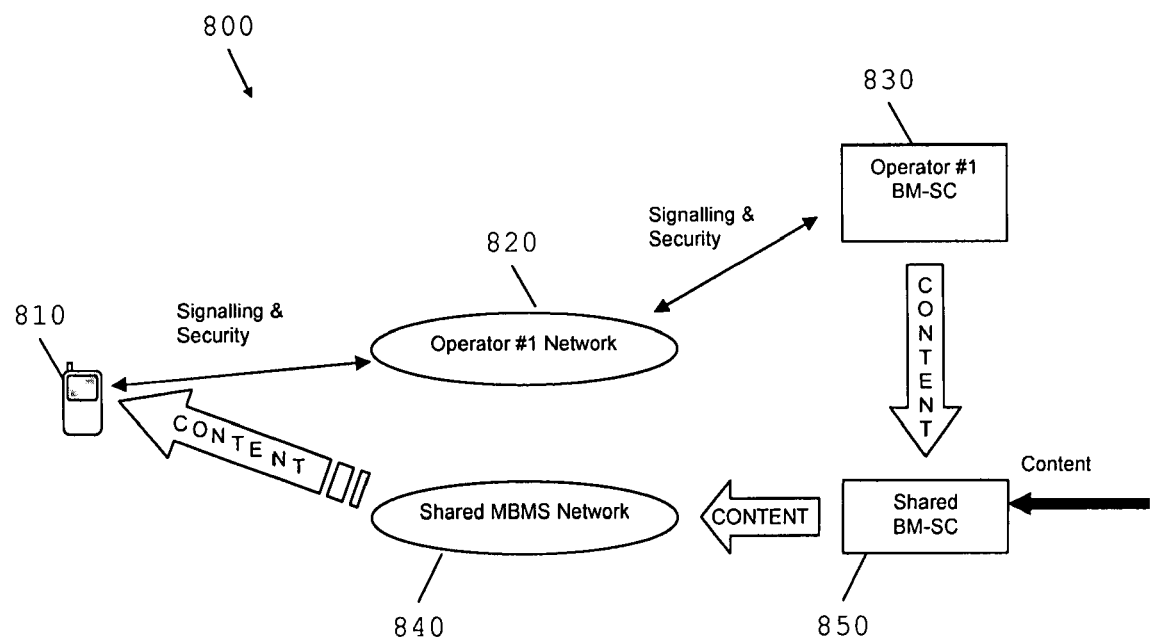

FIG. 8 illustrates a system for providing broadcast and/or multicast content according to a second embodiment of the invention.

Figure 9:
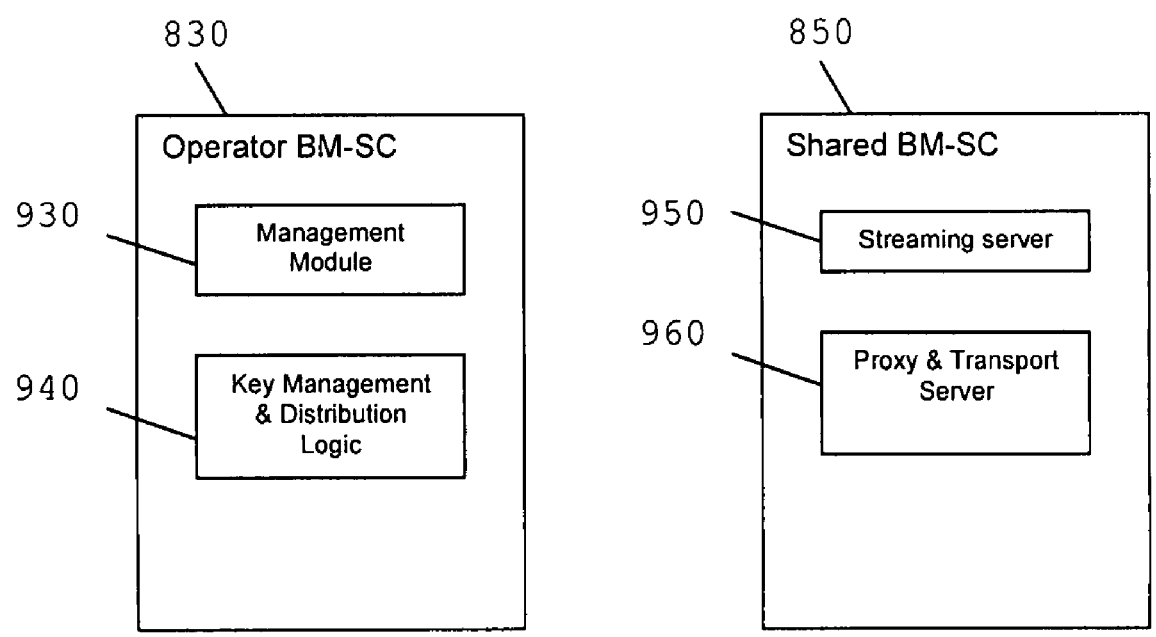

FIG. 9 illustrates examples of the functional components of an operator (BM-SC) and a shared (BM-SC) of FIG. 8.

Figure 10:
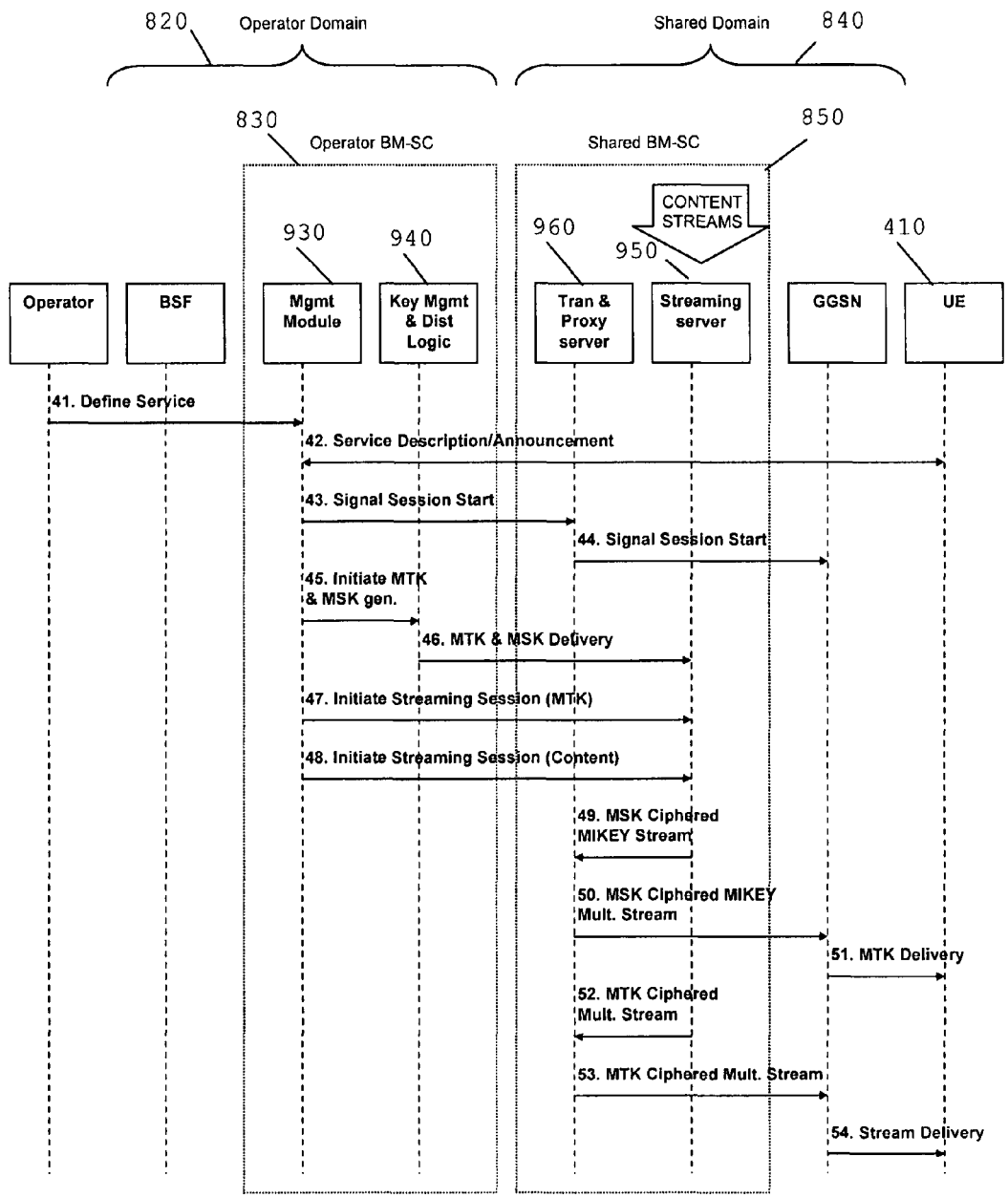

FIG. 10 illustrates an example of signalling flow for the provision of an MBMS service for the embodiment illustrated in FIG. 8.

Figure 11:
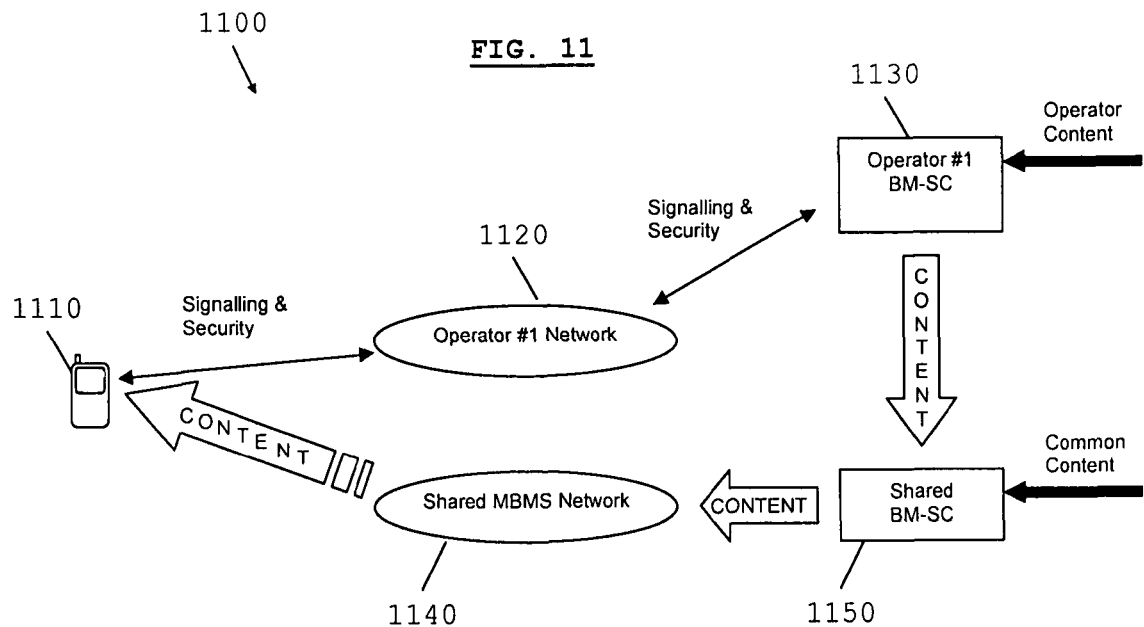

FIG. 11 illustrates a system for providing broadcast and/or multicast content according to a third embodiment of the invention.

Figure 12:
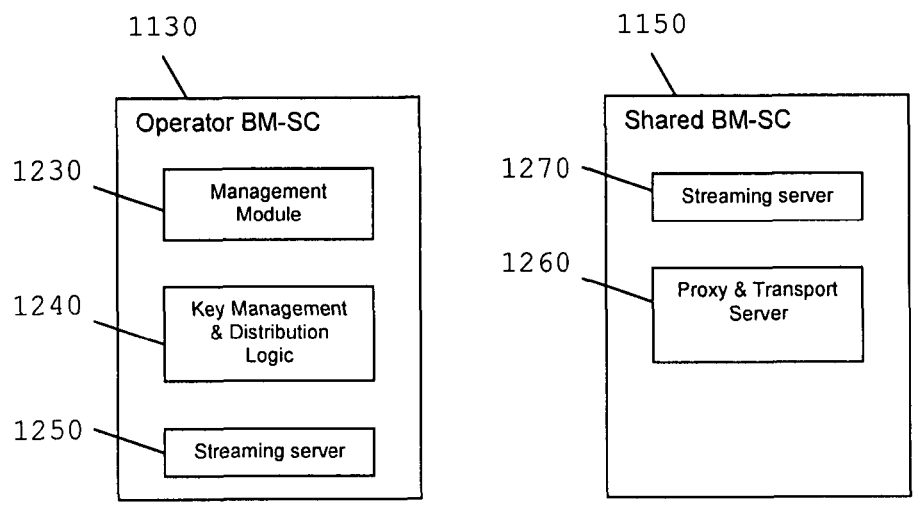

FIG. 12 illustrates examples of the functional components of an operator (BM-SC) and a shared (BM-SC) of FIG. 11.

FIG. 13 illustrates a typical computing system that may be employed to implement processing functionality in embodiments of the invention.

DESCRIPTION OF EMBODIMENT(S) OF THE INVENTION

The following embodiment of the invention will be described in the context of a Multimedia Broadcast Multicast Service (MBMS), as defined in 3GPP TS 22.146, 3GPP TS 23.246 and 3GPP TS 26.346. However, it will be appreciated by a skilled artisan that the inventive concept described herein may be applied to alternative comparable services.

In accordance with embodiments of the invention, apparatus and a method of providing multimedia broadcast multicast services (MBMS) over a communication system that comprises a broadcast multicast service centre (BM-SC) having a plurality of logic elements and a shared network and a proprietary network for providing MBMS content, are described. According to embodiments of the invention, the apparatus and the method support allocating a first portion of logic elements to support MBMS content delivery over the shared network; and allocating a second portion of logic elements to support MBMS content delivery over the proprietary network.

According to embodiments of the invention, the allocating of the first and second portion of logic elements of the BM-SC may be based on whether MBMS content delivery is passed to the shared network or proprietary network and/or whether MBMS content is common between service providers sharing the MBMS network, and/or whether the content delivery is exclusive to an Operator of the proprietary network.

Referring now to FIG. 3, there is illustrated a sub-functional structure 300 of a Broadcast Multicast Service Centre (BM-SC) 310. The sub-functional structure 300 comprises:
(i) service announcement logic 320;
(ii) session and transmission logic 330;
(iii) membership logic 340;
(iv) security logic 350; and
(v) proxy and transport server 360.

The service announcement logic 320 provides service announcements for multicast and broadcast MBMS user services. The service announcement logic 320 may also provide user equipment (UE) with media descriptions specifying the media to be delivered as part of an MBMS user service, and may also provide the UE with MBMS service descriptions specifying the MBMS session to be delivered as part of an MBMS user service, such as multicast service identification, addressing, time, etc.

The session and transmission logic 330 comprises MBMS delivery logic 332 and associated delivery logic 334. In particular, the session and transmission logic 330 is able to schedule MBMS session transmissions, and is able to send MBMS data to, for example, a Gateway GPRS Support Node (GGSN) via the proxy and transport server 360. The session and transmission logic 330 is also able to authenticate and authorise services coming from external sources, and accept content therefrom.

The membership logic 340 provides authentication for UEs requesting to activate an MBMS service. The membership logic 340 may comprise subscription data of MBMS service users, and may generate charging records for MBMS service users.

The key security logic 350 comprises key request logic 352, and key distribution logic 356. The security logic 350 may be used to provide integrity and confidentiality protection of MBMS data, and for distributing MBMS keys to authorised UEs.

These logic/functional elements are in one embodiment of the invention disparate, and consequently are for the most part capable of being distributed between the following logical components:
i) management module;
ii) streaming server;
iii) key management and distribution logic; and
iv) proxy and transport server.

In this regard, the management module is responsible for controlling the internal components of a BM-SC. The management module may provide an external interface, for example an Internet based interface, for enabling remote management thereof, and also for enabling user equipment (UE) to access available content. Furthermore, the management module may also be used to initialise the transmission of a service when the service becomes available. Further still, the management module also initiates the generation and distribution of MBMS Transport Keys (MTKs) that are used to encrypt content streams, as well as the MBMS content streams themselves, by the streaming server. Consequently, the management module may be adapted to perform the service announcement logic 320 and membership logic functions 340.

The streaming server sends out MBMS content streams for broadcasting/multicasting, as well as Multimedia Internet KEYing (MIKEY) messages for delivery of MBMS Traffic Keys (MTKs). The streaming server also integrates therein Secure Real-time Transport Protocol (SRTP) in order to encrypt streams using MTKs, as well as a Forward Error Correction (FEC) layer, as defined in 3GPP TS 026.346. In this manner, the streaming server is adapted to partially perform the session and transmission logic/function 330.

The key management and distribution logic generates MTKs and MBMS Service Keys (MSKs), and provides them to the streaming server. Thus, the key management and distribution logic is adapted to perform the security function 350.

Referring now to FIG. 4, there is illustrated a communication system 400 for providing broadcast and/or multicast content according to a first embodiment of the invention.

The system 400 comprises one or more UEs 410, coupled to an operator network 420, which in turn is coupled to a proprietary BM-SC, such as operator BM-SC 430. The system 400 further comprises a shared BM-SC 450, coupled to a shared MBMS network 440. The, or each, UE 410 is adapted to receive content from the MBMS network 440.

Content is provided to the operator BM-SC 430, and forwarded to the shared BM-SC 450. The shared content is then streamed to a particular multicast IP address by the shared BM-SC 450, via the shared MBMS network 440, where the, or each, UE 410 is 'listening'. The provision of content to the, or each, UE 410 is described in further detail below.

FIG. 5 illustrates an exemplary embodiment of the logical components of the operator BM-SC 430 and shared BM-SC 450 of FIG. 4. As will be appreciated by a skilled, artisan, only those logical/functional components necessary for describing the inventive concept are illustrated, and accordingly each BM-SC may comprise further logical/functional components, for example the operator BM-SC may comprise a bootstrapping server function as well as its own proxy and transport server.

For the illustrated embodiment, the operator BM-SC 430 comprises at least a management module 530, key management and distribution logic 540, and streaming server 550. The shared BM-SC 450 comprises a proxy and transport server 560.

Referring now to FIG. 6, there is illustrated an example of the signalling flow for the provision of an MBMS service in accordance with the embodiment illustrated in FIG. 4.

The signalling flow commences with the operator defining a service, such as a Mobile TV service, for example by providing a service description to the management module 530 of the operator BM-SC 430 (signal '1').

The management module 530 then constructs and distributes a service description/announcement (signal '2'), for example in an eXtensible Mark-up Language (XML) format, as defined in 3GPP TS 26.346. The service description/announcement may be distributed to, for example, the UE 410, using unicast bearers and interactive mechanisms such as Hyper Text Transport Protocol (HTTP) or Session Initiation Protocol (SIP). Alternatively it is envisaged that the management module 530 may use multicast delivery mechanisms with protocols, such as File Delivery over Unidirectional Transport (FLUTE). The service description/ announcement identifies the IP multicast streams (i.e. MBMS services) to the UEs in a form of an IP multicast address and/or Temporary Mobile Group Identity (TMGI) as defined in 3GPP TS 26.346.

Next, the management module 530 initiates a 'session start' procedure by sending a 'session start' message to the transport and proxy server 560 of the shared BM-SC 450 (signal '3').

An example of the 'session start' procedure can be found in section 17.5.2 of 3GPP TS 29.061, wherein the transport and proxy server 560, acting as a proxy Gmb interface, relays a Re-Auth-Request (RAR) message to a Gateway GPRS Support Node (GGSN) of the shared MBMS network 440 (signal '4'). The RAR message informs the GGSN that a transmission is about to be commenced. The transport and proxy server 560 and the GGSN of the shared MBMS network 440 also commences 'listening' for the relevant IP multicast address, which is defined in the 'session start' message.

The management module 530 then initiates generation of the MTK and MSK by the key management and distribution logic 540 (signal '5'). Having generated the MTK and MSK, the key management and distribution logic 540 provides them to the streaming server 550 (signal '6').

Next, the management module 530 initiates a streaming session of the MIKEY message, for the delivery of the MTK to the multicast IP address, by the streaming server 550 (signal '7'). The management module 530 also initiates a streaming session for the MBMS content stream by the streaming server 550 (signal '8'), located on the operator BM-SC 430.

The streaming server 550 commences multicasting the MIKEY messages containing the MTK, and encrypted by the MSK, by forwarding a MIKEY message stream to the transport and proxy server 560 (signal '9'). The transport and proxy server 560 of the shared BM-SC 450 acts as a relay, and forwards the MSK encrypted MIKEY messages to the GGSN of the shared network 440 (signal '10') to the IP multicast address indicated previously in the 'Session Start' message. The MIKEY message is then multicast over the shared network 440 to, for example, the UE 410 (signal '11').

The streaming server 550 of the operator BM-SC 430 then commences multicasting the MBMS content stream, encrypted by the MTK, to the multicast IP address by forwarding the content stream to the transport and proxy server 560 (signal '12'). In the same way as for the MIKEY message stream, the transport and proxy server 560 of the shared BM-SC 450 acts as a relay and forwards the IP multicast packets to the GGSN of the shared network 440 (signal '13'). The MBMS content stream is then multicasted over the shared network 440 to, for example, the UE 410 (signal '14').

Referring now to FIG. 7, there is illustrated an example of the signalling flow for the accessing of an MBMS service by a UE, for example UE 410, again in accordance with the embodiment illustrated in FIG. 4.

The signalling from the UE's side starts with a user of the UE 410 selecting a service, for example from a menu derived from a service announcement from the operator BM-SC 430 described above (signal '21').

The UE 410 then potentially performs a generic bootstrapping architecture (GBA) run (signal '22') with a bootstrapping server function (BSF) within the operator domain, as described in 3GPP TS 32.220, in order to provide mutual authentication between the UE 410 and the BSF 570, and to allow the UE to bootstrap the session keys based on 3GPP Authentication and Key Agreement (AKA) infrastructure in order to derive the initial key 'Ks'. The BSF may be provided within the operator BM-SC 430, or as for the illustrated embodiment elsewhere within the operator domain.

Next, the UE 410 performs MBMS user service registration, as defined in 3GPP TS 33.246, with the key management and distribution logic 540 of the operator BM-SC 430 (signal '23'). The key management and distribution logic 540, performing the functions of a Network Application Function (NAF) for the GBA model described in 3GPP TS 32.220, derives the shared secret key from the BSF to generate relevant MRK key and to authenticate the UE 410 (signal '24').

The UE 410 then performs an MSK request, using the procedures defined in 3GPP TS 32.246 (signal '25'). The key management and distribution logic 540 then delivers the MSK to the UE (signal '26').

Having received the MSK, the UE 410 is able to decrypt the MIKEY messages being multicasted over the shared network 44Q, as described above, in order to retrieve the MTK (step '27'). Having retrieved the MTK, the UE is able to decrypt the MBMS content stream (step '28'), and thereby access the service.

One additional advantage of the embodiment of FIG. 7 results from the scenario when a UE moves out coverage of the shared network, and is able to receive signals only from the Operator's network it is associated with utilising unicast bearers. In that case, when the UE detects that is out coverage, it is able to initiate a Real Time Streaming Protocol (RTSP) request to the Operator's BM-SC streaming server and keep receiving the same content it used to receive over the shared network with a minimal interruption time. The RTSP Uniform Resource Locator (URL) that is used to provide the same content may be indicated to the UE as part of the ESG that it has received.

As can be seen, the functions of a known BM-SC are divided between a proprietary BM-SC, such as the operator BM-SC 430, and a shared BM-SC 440. In particular, the proprietary BM-SC comprises a management module, adapted to perform service announcement and membership functions, and to initialise, or trigger, the broadcast/multicast of MBMS content by a shared BM-SC. Furthermore, the shared BM-SC comprises a proxy and transport server adapted, upon initiation by a proprietary BM-SC, to broadcast/multicast MBMS content over a shared network.

In this manner, by locating the service announcement and membership functions with the operator domain, higher layer service functions, such as access control and charging may be retained within, for example, a network operator's domain, rather than being located within a shared MBMS domain.

Furthermore, it enables operators and the like to reuse existing functionality that may already be available in their own respective domain. In addition, the aforementioned embodiments minimise the duplication of logical elements or equipment.

For the illustrated embodiment, the proprietary BM-SC further comprises key management and distribution logic. In this manner, the management and distribution of keys, and other security features, remains within, for example, the operator domain.

Furthermore, the proprietary BM-SC comprising a streaming server, adapted to perform session and transmission functions, enables MBMS content to be encrypted, utilising keys or the like distributed by the key management and distribution logic, prior to leaving, for example, an operator domain, thereby further improving security.

As will be appreciated by a skilled artisan, operator networks have been built up over time, and as such may have a substantially comprehensive geographical coverage. However, a shared network for providing MBMS services may not comprise such a comprehensive geographical coverage. Consequently, a UE may move out of the geographical coverage of the shared network. If the UE was participating in an MBMS broadcast/multicast session, the UE would lose the broadcast/multicast signal from the shared network.

Thus, by providing an operator BM-SC, the UE may signal to the operator BM-SC, or some other element within the operator domain, that it has lost the shared network signal. The operator BM-SC may then provide the content via the operator network via unicast bearers and RTSP streaming mechanisms, enabling the UE to continue to receive the MBMS content with minimal interruption.

Although this will require the operator to use up valuable bandwidth, since it will only be necessary to support such communication when a UE moves out of the shared network coverage, the number of UEs for which this may be necessary is anticipated as being relatively small.

Referring now to FIG. 8, there is illustrated a communication system 800 for providing broadcast and/or multicast content according to a second embodiment of the invention.

In the same manner as for the embodiment of FIG. 4, the system 800 may comprise one or more UEs 810, coupled to an operator network 820, which in turn may be coupled to a proprietary BM-SC, such as operator BM-SC 830. The system 800 further comprises a shared BM-SC 850, coupled to a shared MBMS network 840. The, or each, UE 810 is adapted to receive content from the MBMS network 840.

For this second embodiment illustrated in FIG. 8, content is provided to the shared BM-SC 850. The content is then streamed to a particular IP multicast address by the shared BM-SC 850, via the shared MBMS network 840, where the, or each, UE 810, is 'listening'. The provision of content to the, or each, UE 810 is described in further detail below.

FIG. 9 illustrates examples of the logical/functional components of the operator BM-SC 830 and shared BM-SC 850 of FIG. 8. Once again, only those logical/functional components necessary for describing the inventive concept are illustrated, and accordingly each BM-SC may comprise further logical or functional components.

For the illustrated embodiment, the operator BM-SC 830 comprises a management module 930 and key management and distribution logic 940. For this second embodiment, a streaming server 950 is located on the shared BM-SC 950, along with a proxy and transport server 960.

Referring now to FIG. 10, there is illustrated an example of the signalling flow for the provision of an MBMS service in accordance with the second embodiment illustrated in FIG. 8.

As can be seen, the signalling flow between the various components is substantially the same as for that of FIG. 6. However, with the streaming server 950 now being located on the shared BM-SC, as opposed to the operator BM-SC, the signals and data passing between the two BM-SCs has changed.

For the first embodiment illustrated in FIG. 6, the 'session start' message (signal '3'), the MIKEY stream messages containing the MTK and encrypted by the MSK (signal '9'), and the MBMS content stream encrypted by the MTK (signal '12') are passed from the operator BM-SC to the shared BM-SC.

For the third embodiment illustrated in FIG. 10, the 'session start' message (signal '43') is still passed from the operator BM-SC 830 to the shared BM-SC 850. However, instead of the MIKEY and encrypted content streams being passed to the shared BM-SC 850, the MTK and MSK are passed to the shared BM-SC 850 (signal '46'), so that the shared BM-SC 850, and in particular the streaming server on the shared BM-SC 850, is able to encrypt the MTK and content stream itself, using the keys generated within the operator domain.

The remaining signals that pass between the operator BM-SC 830 and the shared BM-SC 850 are those for initiating the streaming sessions for the encrypted MIKEY and the encrypted content stream. In this manner, scheduling of MBMS services remains within the operator domain.

As will be appreciated by a skilled artisan, the signalling flow for the accessing of MBMS services by a UE is akin to that illustrated in FIG. 7. In this manner, membership, charging, authorisation, etc. may remain within the operator domain.

Referring now to FIG. 11, there is illustrated a communication system 1100 for providing broadcast and/or multicast content according to a third embodiment of the embodiment of the invention.

In the same manner as for the embodiments of FIG. 4 and FIG. 8, the communication system 1100 comprises one or more UEs 1110, coupled to an operator network 1120, which in turn is coupled to a proprietary BM-SC, such as operator BM-SC 1130.

The communication system 1100 further comprises a shared BM-SC 1150, coupled to a shared MBMS network

1140. The, or each, UE 1110 is adapted to receive content from the shared MBMS network 1140.

For this third embodiment illustrated in FIG. 11, operator specific content is provided to the operator BM-SC 1130. Additionally, common content is provided to the shared BM-SC 1150. The operator BM-SC forwards the operator specific content to the shared BM-SC 1150, which is then able to broadcast/multicast both the operator and common content to the, or each, UE 810, via the shared MBMS network 1140.

FIG. 12 illustrates examples of the logical/functional components of the operator BM-SC 1130 and shared BM-SC 1150 of FIG. 11. Once again, only those logical/functional components necessary for describing the inventive concept are illustrated, and accordingly each BM-SC may comprise further logical/functional components (not shown).

In the same manner as for the embodiment illustrated in FIG. 4, the operator BM-SC 1130 comprises a management module 1230, key management and distribution logic 1240 and a streaming server 1250. For this third embodiment, the shared BM-SC 1150 may also comprise a streaming server 1270, along with a proxy and transport server 1260.

In this manner, for content provided to the operator BM-SC, such as the operator content illustrated in FIG. 11, a signalling flow akin to that of FIG. 6 is utilised. Conversely, for content provided to the shared BM-SC, such as the common content illustrated in FIG. 11, a signalling flow akin to that of FIG. 10 is utilised.

As can be seen, even where the provision of content is divided between a proprietary BM-SC and a shared BM-SC, by locating the service announcement and membership functions within the operator domain, higher layer service functions, such as access control and charging may be retained within, for example, a network operator's domain, rather than being located within a shared MBMS domain.

Furthermore, it enables operators and the like to reuse existing functionality that may already be available in their own domain.

For the illustrated embodiment, the proprietary BM-SC further comprises key management and distribution logic 1240. In this manner, the management and distribution of keys, and other security features, remains within, for example, the operator domain.

It is within the contemplation of the invention that the shared BM-SC may be provided by a network operator, for example a competitor to the operator to which the proprietary BM-SC belongs. Alternatively, the shared BM-SC may belong to a third party, that is to say not a traditional network operator providing telecommunications services, such as General Packet Radio System (GPRS), Universal Mobile Telecommunication System (UMTS), Evolved Packet System (EPS) and the like.

It will be understood that the method and apparatus for providing multimedia broadcast multicast services, as described above may provide, by way of example only, at least one of the following the advantages:

(i) Higher layer service functions, such as access control and charging may be retained within, for example, a network operator's domain, rather than being located within a shared MBMS domain;

(ii) Operators and the like are able to reuse existing, or commissioned, functionality; and/or (iii) The management and distribution of keys and other security features, remains within, for example, the operator domain.

While the invention has been described in terms of particular embodiments and illustrative figures, those of ordinary skill in the art will recognize that the invention is not limited to the embodiments or figures described. Although embodiments of the present invention are described, in some instances, using UMTS terminology, those skilled in the art will recognize that such terms are also used in a generic sense herein, and that the present invention is not limited to such systems.

Those skilled in the art will recognize that the operations of the various embodiments may be implemented using hardware, software, firmware, or combinations thereof, as appropriate. For example, some processes can be carried out using processors or other digital circuitry under the control of software, firmware, or hard-wired logic. (The term 'logic' herein refers to fixed hardware, programmable logic and/or an appropriate combination thereof, as would be recognized by one skilled in the art to carry out the recited functions.) Software and firmware can be stored on computer-readable media. Some other processes can be implemented using analog circuitry, as is well known to one of ordinary skill in the art. Additionally, memory or other storage, as well as communication components, may be employed in embodiments of the invention.

FIG. 13 illustrates a typical computing system 1300 that may be employed to implement processing functionality in embodiments of the invention. Computing systems of this type may be used in the NodeB (in particular, the scheduler of the NodeB), core network elements, such as the GGSN, and the UEs, for example. Those skilled in the relevant art will also recognize how to implement the invention using other computer systems or architectures. Computing system 1300 may represent, for example, a desktop, laptop or notebook computer, hand-held computing device (PDA, cell phone, palmtop, etc.), mainframe, server, client, or any other type of special or general purpose computing device as may be desirable or appropriate for a given application or environment. Computing system 1300 can include one or more processors, such as a processor 1304. Processor 1304 can be implemented using a general or special purpose processing engine such as, for example, a microprocessor, microcontroller or other control logic. In this example, processor 1304 is connected to a bus 1302 or other communications medium.

Computing system 1300 can also include a main memory 1308, such as random access memory (RAM) or other dynamic memory, for storing information and instructions to be executed by processor 1304. Main memory 1308 also may be used for storing temporary variables or other intermediate information during execution of instructions to be executed by processor 1304. Computing system 1300 may likewise include a read only memory (ROM) or other static storage device coupled to bus 1302 for storing static information and instructions for processor 1304.

The computing system 1300 may also include information storage system 1310, which may include, for example, a media drive 1312 and a removable storage interface 1320. The media drive 1312 may include a drive or other mechanism to support fixed or removable storage media, such as a hard disk drive, a floppy disk drive, a magnetic tape drive, an optical disk drive, a compact disc (CD) or digital video drive (DVD) read or write drive (R or RW), or other removable or fixed media drive. Storage media 1318 may include, for example, a hard disk, floppy disk, magnetic tape, optical disk, CD or DVD, or other fixed or removable medium that is read by and written to by media drive 1314. As these examples illustrate, the storage media 1318 may include a computer-readable storage medium having stored therein particular computer software or data.

In alternative embodiments, information storage system 1310 may include other similar components for allowing computer programs or other instructions or data to be loaded into computing system 1300. Such components may include, for example, a removable storage unit 1322 and an interface 1320, such as a program cartridge and cartridge interface, a removable memory (for example, a flash memory or other removable memory module) and memory slot, and other removable storage units 1322 and interfaces 1320 that allow software and data to be transferred from the removable storage unit 1318 to computing system 1300.

Computing system 1300 can also include a communications interface 1324. Communications interface 1324 can be used to allow software and data to be transferred between computing system 1300 and external devices. Examples of communications interface 1324 can include a modem, a network interface (such as an Ethernet or other NIC card), a communications port (such as for example, a universal serial bus (USB) port), a PCMCIA slot and card, etc. Software and data transferred via communications interface 1324 are in the form of signals which can be electronic, electromagnetic, optical or other signals capable of being received by communications interface 1324. These signals are provided to communications interface 1324 via a channel 1328. This channel 1328 may carry signals and may be implemented using a wireless medium, wire or cable, fiber optics, or other communications medium. Some examples of a channel include a phone line, a cellular phone link, an RF link, a network interface, a local or wide area network, and other communications channels.

In this document, the terms 'computer program product' 'computer-readable medium' and the like may be used generally to refer to media such as, for example, memory 1308, storage device 1318, or storage unit 1322. These and other forms of computer-readable media may store one or more instructions for use by processor 1304, to cause the processor to perform specified operations. Such instructions, generally referred to as 'computer program code' (which may be grouped in the form of computer programs or other groupings), when executed, enable the computing system 1300 to perform functions of embodiments of the present invention. Note that the code may directly cause the processor to perform specified operations, be compiled to do so, and/or be combined with other software, hardware, and/or firmware elements (e.g., libraries for performing standard functions) to do so.

In an embodiment where the elements are implemented using software, the software may be stored in a computer-readable medium and loaded into computing system 1300 using, for example, removable storage drive 1314, drive 1312 or communications interface 1324. The control logic (in this example, software instructions or computer program code), when executed by the processor 1304, causes the processor 1304 to perform the-functions of the invention as described herein.

It will be appreciated that, for clarity purposes, the above description has described embodiments of the invention with reference to different functional units and processors. However, it will be apparent that any suitable distribution of functionality between different functional units; processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Although the invention has been described in connection with some embodiments, it is not intended to be limited to the specific form set forth herein. Rather, the scope of the present invention is limited only by the claims. Additionally, although a feature may appear to be described in connection with particular embodiments, one skilled in the art would recognize that various features of the described embodiments may be combined in accordance with the invention.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather the feature may be equally applicable to other claim categories, as appropriate.

Although the invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term 'comprising' does not exclude the presence of other elements or steps.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather indicates that the feature is equally applicable to other claim categories, as appropriate.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to 'a', 'an', 'first', 'second', etc. do not preclude a plurality.

I claim:

1. A method of providing multimedia broadcast multicast services (MBMS) over a communication system that comprises a broadcast multicast service centre (BM-SC) having a plurality of logic elements, a proprietary network of a network Operator, and a shared network that is shared by the network Operator with at least one other Operator, for providing MBMS content, the method comprising, at the BM-SC:

partitioning a first portion of logic elements of the BM-SC to provide MBMS content delivery over the shared network to a remote communication unit in the shared network; and partitioning a second portion of logic elements of the BM-SC different to the first portion of logic elements to provide MBMS content delivery over the proprietary network to a remote communication unit in the proprietary network.

2. The method of claim 1 wherein partitioning the first portion of logic elements of the BM-SC to provide MBMS content delivery over the shared network; and partitioning a second portion of logic elements of the BM-SC to provide MBMS content delivery over the proprietary network is based on whether MBMS content delivery is passed to at least one of: the shared network, proprietary network.

3. The method of claim 1 wherein partitioning the first portion of logic elements of the BM-SC to provide MBMS content delivery over the shared network; and partitioning a second portion of logic elements of the BM-SC to provide MBMS content delivery over the proprietary network is based on whether MBMS content is common between service providers sharing the MBMS network.

4. The method of claim 1 wherein partitioning the first portion of logic elements of the BM-SC to provide MBMS content delivery over the shared network; and partitioning a second portion of logic elements of the BM-SC to provide MBMS content delivery over the proprietary network is based on whether the content delivery is exclusive to an Operator of the proprietary network.

5. The method of claim 1 wherein partitioning a portion of logic elements of the BM-SC comprises partitioning streaming server logic to trigger MBMS content delivery.

6. The method of claim 5 wherein streaming server logic to trigger MBMS content delivery is partitioned in both the first portion of logic elements of the BM-SC to trigger MBMS content delivery over the shared network and the second portion of logic elements of the BM-SC to trigger MBMS content delivery over the proprietary network.

7. The method of claim 1 wherein partitioning a portion of logic elements of the BM-SC comprises partitioning streaming server logic to trigger transport key delivery.

8. The method of claim 7 wherein streaming server logic to trigger transport key delivery is partitioned in both the first portion of logic elements of the BM-SC to transport key delivery over the shared network and the second portion of logic elements of the BM-SC to trigger transport key delivery over the proprietary network.

9. The method of claim 1, the method further comprising:
receiving multimedia broadcast multicast services by a remote communication unit over the shared network;
detecting, by the remote communication unit that it is out of coverage from the shared network, and in response thereto
initiating a Real Time Streaming Protocol (RTSP) request to send to a BM-SC streaming server of the proprietary network to maintain the same content delivery over the proprietary network it had received over the shared network.

10. The method of claim 1 wherein partitioning a second portion of logic elements of the BM-SC to support MBMS content delivery over the proprietary network comprises partitioning management module logic to the proprietary network.

11. The method of claim 10 wherein partitioning management module logic to the proprietary network comprises constructing and distributing a service description of the MBMS content delivery.

12. The method of claim 10 wherein constructing and distributing a service description of the MBMS content delivery comprises generating a transport key and a service key for protecting the MBMS content delivery.

13. The method of claim 12 further comprising encrypting MBMS content with the transport key prior to delivering the MBMS content over the shared network or the proprietary network.

14. The method of claim 13 further comprising, prior to delivering the encrypted MBMS content, forwarding the transport key, encrypted using the service key, to the BM-SC for broadcast/multicast over at least one of: the shared network, proprietary network.

15. A broadcast multicast service centre (BM-SC) for providing multimedia broadcast multicast services (MBMS) over a communication system that comprises a proprietary network of a network Operator and a shared network that is shared by the network Operator with at least one other Operator, the BM-SC comprising:
a first portion of logic elements of the BM-SC partitioned for providing MBMS content delivery over the shared network to a remote communication unit in the shared network; and
a second portion of logic elements of the BM-SC different to the first portion of logic elements partitioned for providing MBMS content delivery over the proprietary network to a remote communication unit in the proprietary network.

16. The BM-SC of claim 15 wherein the BM-SC further comprises logic arranged to partition logic elements of the BM-SC to the first portion and second portion based upon whether MBMS content delivery is passed to at least one of: the shared network, proprietary network.

17. The BM-SC of claim 15 wherein the BM-SC further comprises logic arranged to partition logic elements of the BM-SC to the first portion and second portion based upon whether MBMS content is common between service providers sharing the MBMS network.

18. The BM-SC of claim 15 wherein the BM-SC further comprises logic arranged to partition logic elements of the BM-SC to the first portion and second portion based upon content delivery is exclusive to an Operator of the proprietary network.

19. The BM-SC of claim 15 further comprising streaming server logic to trigger MBMS content delivery.

20. The BM-SC of claim 15 further comprising streaming server logic to trigger transport key delivery.

21. The BM-SC of claim 15 further comprising streaming server logic to trigger transport key delivery in both the first portion of logic elements of the BM-SC to transport key delivery over the shared network and second portion of logic elements of the BM-SC to trigger transport key delivery over the proprietary network.

22. The BM-SC of claim 15 further comprising streaming server logic in both the first portion of logic elements of the BM-SC to trigger MBMS content delivery over the shared network and in the second portion of logic elements of the BM-SC to trigger MBMS content delivery over the proprietary network.

23. The BM-SC of claim 15 further comprising a receiver capable of receiving a Real Time Streaming Protocol (RTSP) request from a remote communication unit over the shared network, in response to the remote communication unit detecting that it is out of coverage from the shared network, and in response thereto, transmitting the same content delivery over the proprietary network that the BM-SC had been transmitting over the shared network.

24. The BM-SC of claim 15 wherein the logic arranged to partition logic elements partitions management module logic to the second portion of logic elements of the BM-SC to support MBMS content delivery over the proprietary network.

25. The BM-SC of claim 24 wherein the management module logic is capable of constructing and distributing a service description of the MBMS content delivery for transmitting to remote communication units over the proprietary network.

26. The BM-SC of claim 24 wherein the management module logic is capable of generating a transport key and a service key for protecting the MBMS content delivery.

27. The BM-SC of claim 26 wherein the management module logic comprises encryption logic for encrypting MBMS content with the transport key prior to delivering the MBMS content over at least one of: the shared network, the proprietary network.

28. The BM-SC of claim 27 further comprising logic for forwarding the transport key, prior to delivering the encrypted MBMS content, wherein the transport key is encrypted using the service key.

29. The BM-SC of claim 28 further comprising logic for forwarding the service key to at least one remote communication unit to decrypt encrypted delivery content.

30. A remote station for receiving multimedia broadcast multicast services (MBMS) over a communication system that comprises a proprietary network of a network Operator and a shared network that is shared by the network Operator with at least one other Operator, the remote station comprising:
    a receiver for receiving multimedia broadcast multicast services over the shared network;
    a detector for detecting that it is out of coverage from the shared network, and in response thereto logic for initiating a Real Time Streaming Protocol (RTSP) request to send to a BM-SC streaming server of the proprietary network to maintain the same content delivery over the proprietary network it had received over the shared network.

31. A communication system for supporting multimedia broadcast multicast services (MBMS), wherein the communication system comprises a proprietary network of a network Operator and a shared network that is shared by the network Operator with at least one other Operator, the communication system comprising:
    logic arranged to partition a first portion of logic elements of a broadcast multicast service centre (BM-SC) to provide MBMS content delivery over the shared network to a remote communication unit in the shared network; wherein the logic is also arranged to partition a second portion of logic elements of the BM-SC that is different to the first portion of logic elements to provide MBMS content delivery over the proprietary network to a remote communication unit in the proprietary network.

32. A non-transitory computer program product having executable program code stored therein for supporting multimedia broadcast multicast services (MBMS) in a communication system comprising a proprietary network of a network Operator and a shared network that is shared by the network Operator with at least one other Operator, the computer program product comprising program code for, when executed at a broadcast multicast service centre (BM-SC):
    partitioning a first portion of logic elements of the BM-SC to provide MBMS content delivery over the shared network to a remote communication unit in the shared network; and
    partitioning a second portion of logic elements of the BM-SC to provide MBMS content delivery over the proprietary network to a remote communication unit in the proprietary network.

33. An integrated circuit arranged to support multimedia broadcast multicast services (MBMS) over a communication system that comprises a proprietary network of a network Operator and a shared network that is shared by the network Operator with at least one other Operator, the integrated circuit comprising:
    logic arranged to partition a first portion of logic elements of a broadcast multicast service centre (BM-SC) to provide MBMS content delivery over the shared network to a remote communication unit in the shared network; wherein the logic is also arranged to partition a second portion of logic elements of the BM-SC that is different to the first portion of logic elements to MBMS content delivery over the proprietary network to a remote communication unit in the proprietary network.

\* \* \* \* \*

UNITED STATES PATENT AND TRADEMARK OFFICE
CERTIFICATE OF CORRECTION

PATENT NO. : 8,229,346 B2  
APPLICATION NO. : 11/803806  
DATED : July 24, 2012  
INVENTOR(S) : Haris Zisimopoulos Page 1 of 1

It is certified that error appears in the above-identified patent and that said Letters Patent is hereby corrected as shown below:

Claim 33, Column 18, Line 35

Should read as,
to the first portion of logic elements to provide MBMS content

Signed and Sealed this
Ninth Day of April, 2013

Teresa Stanek Rea
*Acting Director of the United States Patent and Trademark Office*